United States Patent [19]

Youden

[11] 4,253,359
[45] Mar. 3, 1981

[54] DRIVE SYSTEM FOR MULTIPLE SPINDLE MACHINE TOOL

[75] Inventor: David H. Youden, Cornish, N.H.

[73] Assignee: Cone-Blanchard Machine Company, Windsor, Vt.

[21] Appl. No.: 87,711

[22] Filed: Oct. 24, 1979

[51] Int. Cl.³ .............. B23B 21/00; B23B 3/00; B23B 3/34

[52] U.S. Cl. .............. 82/21 B; 82/2 B; 82/3

[58] Field of Search .............. 82/2 B, 2 C, 21 B, 3

[56] References Cited

U.S. PATENT DOCUMENTS

| | | | |
|---|---|---|---|
| 2,118,024 | 5/1938 | Potter et al. | 82/21 B |
| 2,741,732 | 4/1956 | Cunningham | 82/2 B |
| 3,573,588 | 4/1971 | Geyer et al. | 82/2 B |
| 3,746,955 | 7/1973 | Kobayashi | 82/2 B |
| 3,811,345 | 5/1974 | Kobayashi et al. | 82/2 B |
| 3,864,994 | 2/1975 | White | 82/3 |
| 3,894,452 | 7/1975 | Kazik et al. | 82/2 B |
| 3,978,745 | 9/1976 | Okamoto | 82/2 B |
| 4,106,375 | 8/1978 | Gurdak et al. | 82/21 B |

*Primary Examiner*—Harrison L. Hinson
*Attorney, Agent, or Firm*—Kenway & Jenney

[57] ABSTRACT

A drive system for a multiple spindle machine tool which includes a separate servo motor for powering the drum shaft which serves as the basic control element for the timing and movement of tools which are operable upon the workpieces carried in the spindles. The speed of the servo motor is regulated by a tachometer in a feedback loop to hold the speed of the motor at any chosen value. The drum shaft rotates at either high speed during tool traverse or low or feed speed during machining operations. A second tachometer driven by the spindle drive system generates a signal proportional to the spindle speed and that signal coordinates the low feed speed of the drum shaft with the spindle speed. Conventional clutches for high-speed and reverse operation of the drum shaft are replaced by switches and potentiometers.

9 Claims, 3 Drawing Figures

DRIVE SYSTEM FOR MULTIPLE SPINDLE MACHINE TOOL

BACKGROUND OF THE INVENTION

This invention relates in general to drive systems for multiple spindle machine tools and in particular to a drive system which employs an independent servo motor which permits matching of spindle speed with tool feed speed.

Multiple spindle machine tools for automatically performing complex machining at high production rates are well known. Typically, these machines have a number of spindles symmetrically arrayed in a spindle carrier which indexes the spindles circularly from one machining station to the next. The workpiece carried in each spindle is subjected to one or more machining operations at each station to produce a finished piece which may be ejected after the machining operations at the final station. The tools for performing the various machining operations are usually carried by movable cross and end slides, the positions and movement of which are controlled by a rotating drum or cam shaft.

Various drive systems for multiple spindle machine tools are employed. Because of the complexity and the automatic nature of the machine operations, some of these drive systems have been developed to a very sophisticated degree. U.S. Pat. No. 3,864,994 entitled "Multiple Spindle Machine With Variable Speed Drive", which is assigned to the assignee of this application, discloses one such sophisticated drive system. The system of the cited patent includes dual sets of change gears to select spindle speed and feed speed for the various machining tools. A high-speed clutch and a feed clutch alternately select either a high speed or a low speed of rotation for a power feed cross shaft which drives the drum shaft. These clutches are controlled by switches actuated by the drum shaft itself, and, typically, the drum shaft rotates about 250 degrees at high speed and about 110 degrees at low speed. To maximize machining time, the high-speed clutch causes traverse of the tool-holding cross and end slides from a fully retracted position to a point adjacent the machining area to occur rapidly. The feed clutch moves the tool at a slower feed rate during the machining operation, the feed rate being related by mechanical interconnection to the spindle rotational speed. The tool continues to move at the feed rate until a limit is reached and it is then returned at a rapid traverse rate to its fully retracted position at which time the spindle carrier indexes.

In addition to the mechanisms and clutches for controlling the high-speed traverse or low-speed feed rate, it is also conventional to provide a reverse clutch to reverse the direction of rotation of the drum shaft if necessary during set-up or in the event of an accident in order that the tools may be withdrawn from the workpieces.

Although the patented drive system and others are adequate and have achieved considerable commercial success, they are rather complex and difficult to build and service. They also involve numerous wearing parts which ultimately require replacement with loss of operating time and increased costs of operations. Moreover, because of the large number of rotating parts, a considerable amount of noise is generated. Attenuation of that noise to meet industry and government requirements can be accomplished only by incorporating suitable guards and sound-absorbing material which adds to the cost of the machine tool.

A principal object of the present invention is to increase the productivity of multiple spindle machine tools by simplifying and increasing the flexibility of their drive systems. Another object of the present invention is to minimize idle time by optimizing the high speed at which tools traverse from a retracted position to a machining position and the speed at which they traverse from the limit of the machining area to the fully retracted position. A further object is to simplify the matching of spindle speeds and tool feed rates during machining operations. A still further object of the present invention is to eliminate complicated gearing and clutches normally utilized for high speed traverse and lower speed feed rates and for reversing operations. Still another object is to avoid the need of noise-attenuating devices and material in machine tools.

SUMMARY OF THE INVENTION

A key point of the present invention involves the use of a separate servo motor for powering the drum shaft of a multiple spindle machine tool. With such a secondary power source, it is possible to eliminate high speed, low speed and reverse clutches by substituting simple switches and potentiometers. The servo motor may be controlled at any desired speed by means of a feedback loop which includes a tachometer. Another tachometer driven by the spindle generates a signal which, along with suitable speed change gears, may be utilized to match the feed rate during machining to the spindle speed whereby each specific machining operation may be carried out under optimum conditions.

For a better understanding of the present invention, its objects and features, there follows a detailed description of a specific embodiment of the invention which should be read with reference to the attached drawing in which:

FIG. 1 is a schematic showing of an improved drive system for a multiple spindle machine tool, FIG. 2 is a schematic showing of a logic network used in the drive system, and FIG. 3 is an outline of circuit interconnections.

DESCRIPTION OF PREFERRED EMBODIMENT

A multiple spindle machine tool of the type in which the present invention may advantageously be incorporated is disclosed in the previously mentioned U.S. Pat. No. 3,864,994, the disclosure of which is hereby incorporated by reference. In the cited patent, a multiple spindle machine tool is disclosed which includes a massive base which supports a first housing for a spindle carrier and a second housing containing the indexing and drive mechanisms for the machine. Cross- and end-working tool slides are supported on the base and by the housing in positions from which they may be advanced to carry tools into machining relation with workpieces carried by the spindles.

The spindle carrier is generally circular and supports a number of rotatable spindles in a symmetrical array which may be indexed into various work stations at which the machining operations are carried out.

Figure 1:
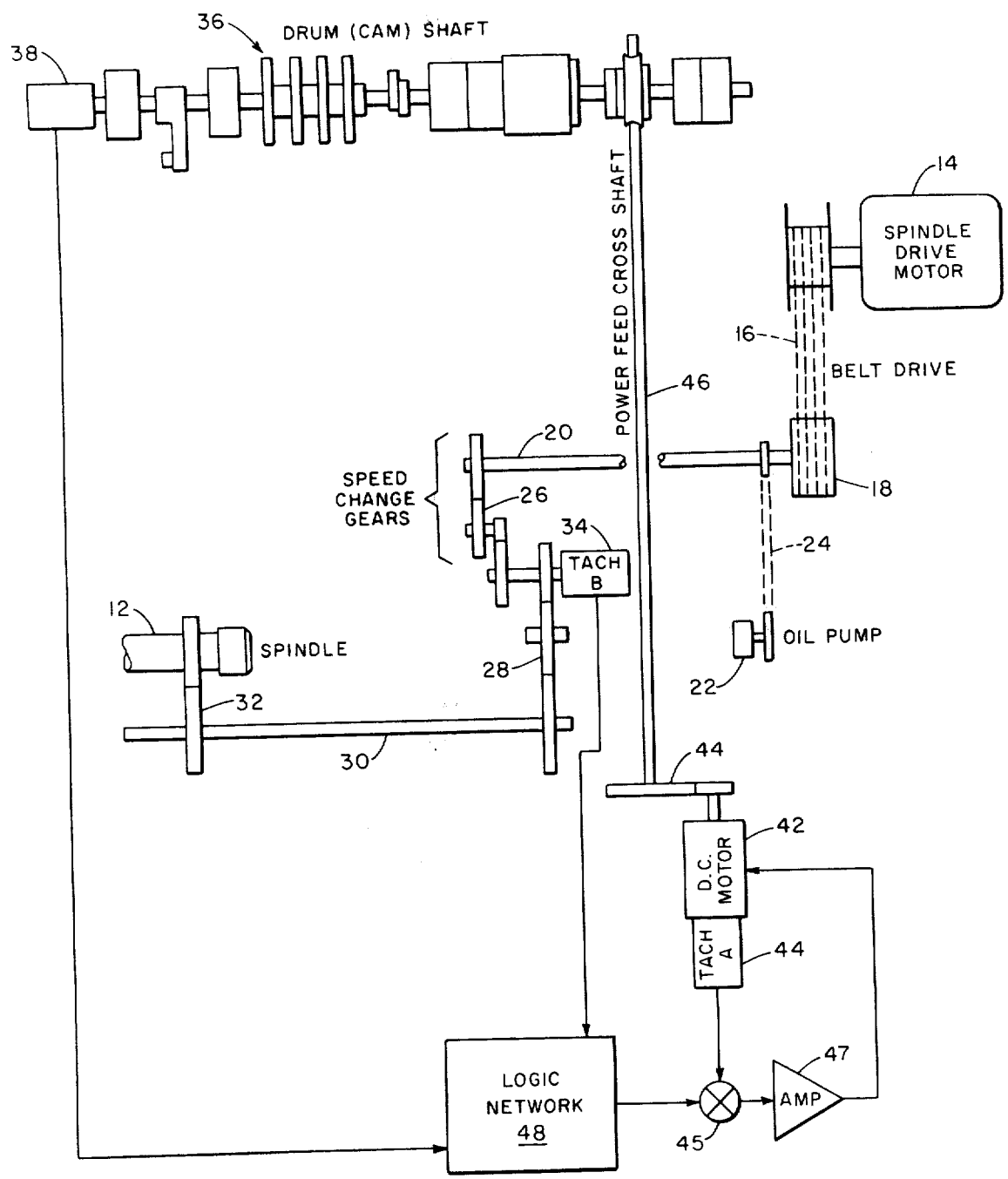

In FIG. 1 of the drawing, one such spindle 12 is fragmentarily and schematically shown. Rotary drive for the spindle 12 is ultimately derived from a spindle drive motor 14. Multiple belts 16 and a pulley 18 transmit power to a shaft 20. An oil pump 22 is also driven by the shaft 20 through a chain 24. The oil pump 22 serves the purpose of providing oil under pressure for lubrication of various elements of the machine which are not a part of the present invention. Drive for the spindle is actually provided through a set of replaceable speed change gears 26, a gear train 28, a shaft 30 and coupling gears 32. A tachometer 34 is driven by a gear interposed between the speed change gears 26 and the gear train 28 to generate a signal related to the speed of rotation of the spindle 12.

As was previously noted, and as is clearly explained in the cited U.S. Pat. No. 3,864,994, the various motions of the cross and end slides which carry the tools which perform the machining operations are derived from a drum shaft 36 which is shown schematically in FIG. 1 of the drawing. In addition to a series of barrel cams which are rotated by the drum shaft to impart the proper motion to cam followers which control the cross and end slides, the drum shaft also carries a series of suitable cams which actuate a series of switches 38 mounted adjacent the drum shaft. In this connection, as has been noted, the drum shaft imparts motion at two different speeds to the cross and end slides. As the cross and end slides advance from a fully retracted position to a position at which machining begins, they are first moved very rapidly until they approach the area where machining takes place. At this point, the drum shaft rotation is decelerated. Movement of the tool slides is similarly slowed as the drum shaft reaches the point where the slides are moved at the low speed normally referred to as the feed rate. Conversely, after the tools have advanced at the feed rate to a point where the machining operation is completed, they are again rapidly withdrawn to their fully retracted position. In prior art systems, these speeds are selected by the action of the switches in the switch box 38 to cause the engagement of appropriate clutches to rotate the drum shaft about 250 degrees at high speed and about 110 degrees at low or feed speed. In addition to the high-speed and low-speed clutches which are involved, it is also conventional to provide a reverse clutch in order that the drum shaft may be rotated in reverse as needed either during set-up or in the event of an accident to cause the tools to be withdrawn from the machining area.

Although in the present invention the switches are retained in the switchbox 38, both the high-speed and the reverse clutches are eliminated. Also, the conventional feed clutch and feed change gears are eliminated because drive for the drum shaft is derived from a servo motor 42. In order to hold the output speed of the servo motor 42 at any chosen value, a tachometer 44 driven by motor 42 provides an output feedback signal to regulate the speed of the motor 42. A second signal is derived from a logic network 48 and both signals are fed to a summing junction 45 which is included in a servo amplifier 46.

The servo motor 42 drives the drum shaft 36 by means of a single set of reduction gears 44 and a power feed cross-shaft 46.

Figure 2:
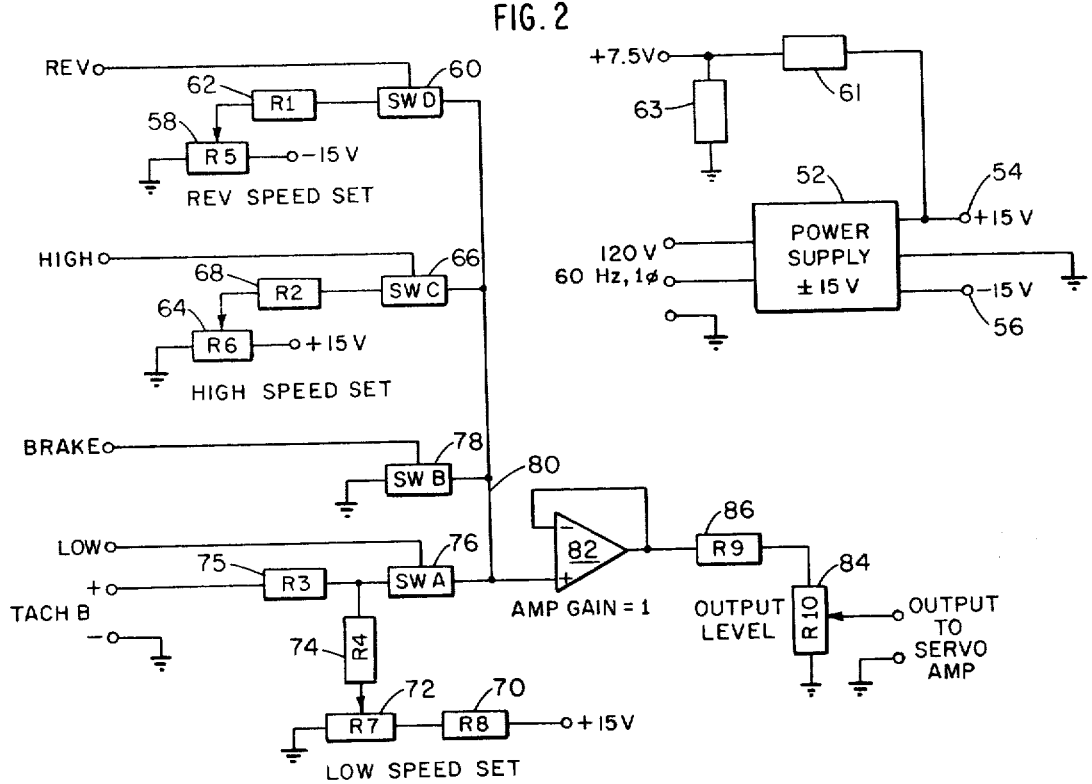

Circuit detail on the logic network 48 is shown schematically in FIG. 2. A series of logic input terminals for the functions of Reverse, High Speed, Brake and Low Speed are provided as well as an input for spindle speed derived from the tachometer 34. The input terminals are separately connected to the input terminals of a quad bilateral solid state switch. One such switch suitable for this application is the commercially available quad bilateral switch designated CD4066B.

Basic D.C. power for the logic circuitry which provides the commands to the servo amplifier 46 and for speed-setting is derived from a power supply 52, the input to which may be a conventional 120-volt 60-cycle single-phase source. The power supply 52 has a positive 15-volt terminal 54 and a negative 15-volt terminal 56 for speed-setting. A positive 7½-volt output terminal 57 is also provided by means of a voltage divider composed of the resistors 61 and 63 for switching purposes.

The 15-volt negative voltage supply is shown connected directly across a potentiometer 58 to ground. However, a suitable voltage dividing resistor may be connected in series with the potentiometer 58 if a lesser voltage is required for use with the segment 60 of the solid state analog switch.

Negative voltage is picked off the potentiometer 58 and applied to the switch 60 through a current-limiting resistor 62 for drum shaft reverse drive.

The 15-volt positive voltage is shown connected across a potentiometer 64. Again, if needed, a voltage-dividing resistor may be used. Voltage is picked off from the potentiometer 64 and made available at a second segment 66 of the solid state analog switch through a current-limiting resistor 68 for high speed drum shaft drive. The same 15-volt positive voltage is connected across the combination of a voltage-dropping resistor 70 and a potentiometer 72. Voltage from the potentiometer 72 is picked off through a current-limiting resistor 74 and made available at a segment 76 of the solid state analog switch for setting basic low speed drum shaft drive. A second input from the tachometer 34 is applied to the switch 76 through a current-limiting resistor 77. Still another segment 78 of the solid state analog switch is connected to ground for use in the braking function. All of the switches have their output terminals connected to a common bus line 80 which leads to an operational amplifier 82 which has unity gain.

The output of the amplifier 82 is applied across a series-connected output level potentiometer 84 and current-limiting resistor 86. Voltage is picked off the potentiometer 84 and serves as the principal input to the servo amplifier 46.

Figure 3:
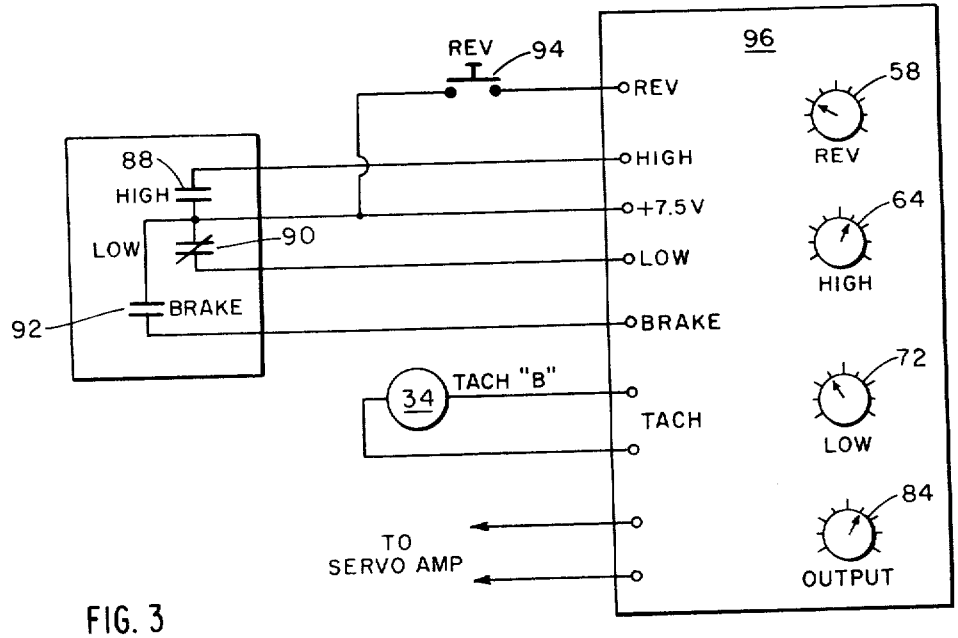

In FIG. 3, various interconnections are outlined. Within the switchbox 38 is a group of switches which are actuated by suitable cams mounted at the end of the drum shaft. These include a high-speed switch 88, a low-speed switch 90 and a brake switch 92. The high-speed switch 88 is shown as normally open and the low-speed switch is shown as normally closed. It should be understood that at all times the relationship is that when one switch is closed the other is open.

The various terminals shown at the left of FIG. 2 are also shown in FIG. 3. In the case of the REVERSE function, the REVERSE terminal is connected through a momentary-contact manual switch 94 to a positive 7.5-volt terminal. The REVERSE speed-setting potentiometer 58 control is mounted adjacent the top of a panel 96.

Reverting to FIG. 2, it may be seen that closing of the switch 94 applies 7.5 volts positive to the solid state which segment 60, closing it to apply the negative voltage picked off the potentiometer 58 to the common bus line 80 and thence through the amplifier 82 and output level control 84 to the servo amplifier 46 to drive the servo motor 42 in reverse, thus reversing the direction of rotation of the drum shaft. The speed of reverse rotation is adjustable in accordance with the setting of the potentiometer 58.

In similar fashion, as the drum shaft is rotated normally to the point where the switch 88 is closed, 7.5 volts positive is applied to the switch segment 66 permitting the positive voltage picked off the potentiometer 64 to be applied ultimately to the servo amplifier 46 which causes the servo motor 42 to rotate the drum shaft in a forward direction at a high speed determined by the setting of the potentiometer 64.

The low speed rotation is somewhat more complicated in that when the switch 90 is closed as the drum shaft rotates, 7.5 volts positive is applied to the switch segment 76 to close it. Voltage picked from the potentiometer 72 is summed with that from the tachometer 34 and passed by the switch segment 76 for application to the servo amplifier 46 to cause the servo drive motor 42 to rotate the drum shaft at a low speed determined by the setting of the potentiometer 72 and the spindle speed as represented by the voltage generated by the tachometer 34.

In prior art drive systems such as that of the patent cited above a power feed works is utilized with suitable feed change gears and clutching to drive the power feed cross shaft. The power feed works also contains sets of gears which are connected to the spindle in order to relate the feed speed to the spindle speed. In the present invention, the entire power feed works is eliminated and is replaced by the logic network 48 and the switch-potentiometer combinations. Productivity of the machine is increased because the flexibility of control is far greater. Moreover, the capacity to set the high speed at an optimum value minimizes idle time of the machine. Feed rates can be selected electronically to match the machining operations to the particular job.

What is claimed is:

1. In a machine tool having a drive system which includes a drive motor and at least a workpiece-holding spindle rotatably driven by said drive motor, tool-carrying cross and end slides and a drum shaft for controlling the operations upon said workpiece of said tools carried by said sliders, the combination of a variable speed direct current servo motor for driving said drum shaft, switch means positionally controlled by said drum shaft in a predetermined sequence determined by the rotational position thereof, a source of control voltage for said servo motor and means connected between said switch means and said source of control voltage for varying the control voltage applied to said servo motor in accordance with the instantaneous rotational position of said drum shaft.

2. In a machine tool having a drive system as defined in claim 1, the combination wherein said means connected between said switch means and said source of control voltage comprises a logic network which includes first and second potentiometers and first and second solid state switches for applying differing control voltages to said servo motor and means for actuating said solid state switches in accordance with the instantaneous rotational position of said drum shaft.

3. In a machine tool having a drive system as defined in claim 2, the combination which includes a servo amplifier connected between said logic network and said servo motor and wherein said switch means comprises a pair of switches, the first of which is maintained in closed condition and the second in open condition during a first portion of a revolution of said drum shaft and the second of which is maintained in closed condition and the first in open condition during a second portion of a revolution of said drum shaft, said first switch when closed applying triggering voltage to a first of said solid state switches to connect said source of voltage through said first potentiometer to said servo amplifier, said second switch when closed applying triggering voltage to a second of said solid state switches to connect said source of voltage to said servo amplifier through said second potentiometer.

4. In a machine tool having a drive system as defined in claim 3, the combination which includes a first tachometer driven by said spindle, and means coupling the output of said first tachometer to one of said solid state switches in said logic network in conjunction with the output of one of said potentiometers whereby the sum of the outputs of said first tachometer and of said potentiometer is applied to said servo amplifier.

5. In a machine tool having a drive system as defined in claim 4, the combination in which said servo motor drives said drum shaft at a relatively low speed during a first portion of each revolution thereof, the rate of said relatively low speed being determined by the sum of the outputs of said first tachometer and said one of said potentiometers.

6. In a machine tool having a drive system as defined in claim 5, the combination which includes cams mounted on said drum shaft, said cams being disposed to activate said pair of switches in predetermined sequence as said drum shaft is rotated by said servo motor whereby said drum shaft is rotated at said relatively low speed during a first portion of each revolution thereof and at a relatively high speed during each revolution thereof.

7. In a machine tool having a drive system as defined in claim 6, the combination which includes a second tachometer driven by said servo motor, means for combining the output of said second tachometer with the output of said logic network and means for applying the combined output of said second tachometer and said logic network to said servo amplifier.

8. In a machine tool having a drive system as defined in claim 1, the combination wherein said switch means are activated by rotation of said drum shaft to apply a relatively low voltage to said servo motor during a first portion of each revolution of said drum shaft, and a relatively high voltage to said servo motor during a second portion of each revolution of said drum shaft, said combination further including means for adjusting said relatively high voltage over a predetermined range, and means for adjusting said relatively low voltage.

9. In a machine tool as defined in claim 8, the combination which includes means for generating a voltage varying with the speed of rotation of said spindle, and means for mixing the output of said last-mentioned means with said relatively low voltage.

* * * * *